United States Patent [19]

Cunha

[11] Patent Number: 5,253,976
[45] Date of Patent: Oct. 19, 1993

[54] INTEGRATED STEAM AND AIR COOLING FOR COMBINED CYCLE GAS TURBINES

[75] Inventor: Francisco J. Cunha, Schenectady, N.Y.

[73] Assignee: General Electric Company, Schenectady, N.Y.

[21] Appl. No.: 794,032

[22] Filed: Nov. 19, 1991

[51] Int. Cl.$^5$ .............................................. F01D 5/18
[52] U.S. Cl. .................... 415/114; 415/115; 415/48; 416/96 R; 416/96 A; 416/97 R; 416/231 R; 60/39.54
[58] Field of Search ................. 415/114, 115, 116, 47, 415/48; 416/95, 96 R, 96 A, 97 R, 97 A, 231 R; 60/39.54

[56] References Cited

U.S. PATENT DOCUMENTS

| | | | |
|---|---|---|---|
| 2,750,147 | 6/1956 | Smith | 415/116 |
| 3,553,712 | 10/1970 | Kercher | 416/97 R |
| 3,628,885 | 12/1971 | Sidenstick et al. | 416/97 R |
| 4,184,797 | 1/1980 | Anderson et al. | 415/115 |
| 4,314,442 | 2/1982 | Rice . | |
| 4,514,144 | 4/1985 | Lee | 416/97 R |
| 4,526,512 | 7/1985 | Hook | 416/96 A |
| 4,565,490 | 1/1986 | Rice . | |
| 4,820,116 | 4/1989 | Hovan et al. | 415/115 |

FOREIGN PATENT DOCUMENTS

| | | | |
|---|---|---|---|
| 0202304 | 11/1983 | Japan | 416/97 R |
| 0003404 | 1/1985 | Japan | 416/97 R |
| 0135606 | 7/1985 | Japan | 416/97 R |
| 0728834 | 4/1955 | United Kingdom | 416/96 A |
| 2042648 | 9/1980 | United Kingdom | 416/97 A |

OTHER PUBLICATIONS

"Future Gas Turbine Development Options Definition Study" Electric Power Research Institute, Jun. 1987.
"Development, Installation . . . Generator", Burnham et al., pp. 1-8, ASME, International Gas Turbine Conference, Dusseldorf, Germany, Jun., 1986.

Primary Examiner—Edward K. Look
Assistant Examiner—Christopher Verdier
Attorney, Agent, or Firm—Nixon & Vanderhye

[57] ABSTRACT

A steam or air-cooled combined cycle gas turbine includes first and second turbine stages and a second nozzle stage disposed about a spacer between the turbine stages. Cooling steam is passed through the nozzle vanes radially inwardly and through the seal between the spacer and the nozzle stage into a pair of chambers. Inlet ports are carried by the first and second-stage turbines for conducting the steam through both single and multi-pass circuits in the turbine blades to cool the blades. Steam is inlet along the axis of the turbine for mixing with the steam inlet past the nozzle stage and spacer seal. Air is inlet adjacent the axis of the turbine and a valve selectively opens and closes an air inlet for admitting air into the chambers. When the turbine is in a start-up mode or steam is not available, the valve is open to admit air into the chambers to supply cooling air to the turbine blades. When steam is available, the valve is closed and the turbine blades are steam cooled.

24 Claims, 3 Drawing Sheets

INTEGRATED STEAM AND AIR COOLING FOR COMBINED CYCLE GAS TURBINES

BACKGROUND AND SUMMARY OF THE INVENTION

The present invention relates to a cooling system for a combined cycle gas turbine and particularly relates to integrated steam and air cooling for a gas turbine, a method of operating the system and various components of the system, including turbine blades adapted specifically for steam cooling and an arrangement of the nozzle and turbine stages for steam or air cooling.

The traditional approach for cooling gas turbine blades and nozzles is to extract air from a source at a sufficiently high pressure, e.g., by extracting air from the intermediate and last stages of the gas turbine compressor. A series of internal flow passages are typically used to achieve the desired mass flow objectives for cooling the turbine blades; whereas, for nozzles, cooling air is supplied and controlled through external piping. The cooling air flow circuits bypass the combustors where heat is supplied to the thermodynamic cycle. Thus, the diverted coolant air does not receive energy directly from the combustors and does not completely expand through the turbine. This arrangement represents parasitic losses to the turbine output and degrades overall performance efficiency.

Steam cooling in reheat gas turbines has been previously discussed, e.g., see U.S. Pat. Nos. 4,314,442 and 4,565,490 to Rice. Steam cooling has also been discussed in a report by the Electric Power Research Institute, Report No. RP2620-1, entitled "Future Gas Turbine Development Options Definition Study," dated June 1987. This report describes the anticipated performance improvement for steam cooling from a thermodynamic cycle analysis perspective. In the context of that report, the steam cooling supply requirements included a very high pressure source, i.e., on the order of 1840 psia, because it was then believed that such high pressure was needed to overcome circuit friction losses, as well as adverse rotational and centrifugal field forces associated with that proposed closed cooling circuit configuration.

In a combined cycle operation, steam at several pressure and temperature levels is readily available. Coolant air in a gas turbine can be replaced by steam, which is the better cooling medium. Moreover, the problem of degradation of thermal efficiency associated with air as the cooling medium is ameliorated as the transition from air to steam cooling is performed. By using steam as coolant, it is also possible to increase the firing temperatures in the gas turbine cycle.

According to the present invention, it has been found desirable to integrate steam and air cooling in a combined cycle system where primary cooling is provided by steam and off-design operating conditions, e.g., start-up, is provided by air. That is, it has been found desirable to operate a gas turbine using steam cooling and to have available a backup for operational off-design cooling using air, for example, during start-up or an abrupt failure in the supply of steam. In accordance with this invention, an existing air-cooled gas turbine is modified to change over from operational air cooling to steam cooling. Thus, cooling flow distributions, particularly in the first and second-stage turbine blades and second-stage nozzles, require necessary modification to accommodate steam cooling.

More particularly, second-stage nozzle vanes and first-stage turbine blades are designed specifically to take advantage of the thermal efficiencies of steam cooling. In the second-stage nozzle, a pair of pipes or tubes extends from a manifold coupled to a suitable source of steam from the combined cycle operations and extend through the nozzle vanes and the diaphragm associated with the nozzle vanes. The inner surface of the diaphragm seals with the outer surface of a spacer in a conventional manner, the spacer being carried for rotation with and between the wheels mounting the first and second-stage turbine blades. The spacer defines a pair of chambers with the first and second-stage turbine wheels. Coolant steam passing through the nozzle vanes and through the diaphragm communicates with the chambers and with inlet ports for passage through the first and second-stage turbine blades, as described hereinafter.

Further, discrete inserts envelop and encompass each of the tubes through the nozzle vanes. Each insert is provided with a plurality of apertures for flowing air supplied to the space between the steam carrying tube and the insert outwardly into a cavity defined between the insert and the walls of the nozzle vane. The air cools the nozzle vane and exits the vane both through a series of apertures in its trailing edge and into a chamber within the diaphragm for exit in opposite axial directions into the gas flow through the turbine. The tubes conducting the steam have ribs about their external surfaces to improve the heat transfer relation between the steam within the tubes and the air flowing within the inserts. The external surfaces of the inserts are provided with ribbing, preferably spiral or helical, to direct the flow to the trailing edges and the diaphragm. In operation, the heat transfer between the steam and air lowers the temperature of the steam and increases the temperature of the air. The air flow, however, is expanded and cooled upon passing through the apertures in the insert for cooling impingement against the inside surfaces of the nozzle vanes.

The steam flows through the tubes and diaphragm and through the seal between the diaphragm and the spacer. Preferably, the seal is a labyrinth-type seal with multiple projecting teeth. In accordance with this invention, injector nozzles are spaced one from the other circumferentially about the sealing surface of the spacer. The steam flows from the diaphragm between the adjacent teeth of the labyrinth seal for flow through the injector nozzles in the spacer. The nozzles are shaped to accelerate the flow of steam into the chambers on opposite sides of the spacer.

Coolant steam for the first and second turbine stages is additionally inlet from a location adjacent the shaft of the turbine into the areas between the first and second-stage turbine wheels. Passages are provided through the spacer to enable the steam to enter the chambers. Thus, this inner steam flow passes radially outwardly by centrifugal force to mix with the steam input to the chambers from the tubes of the nozzle stage and the injector nozzles of the spacer. This combined steam flows through and cools the turbine blades of the first and second stages.

In a further aspect of the present invention, each first-stage turbine blade includes a serpentine cooling arrangement. In a preferred embodiment, this includes four coolant circuits: two single-pass radially outwardly directed passages adjacent the leading and trailing edges of the blade and two intermediate three-pass, forward and aft circuits. The inlet ports for the serpentine passages are through the pedestals mounting the turbine blades. With respect to the forward and aft intermediate circuits, the respective inlet ports are located in the root portion of the blade and the flow of steam is through passages first directed radially outwardly toward the tip portion, then radially inwardly toward the root portion and finally radially outwardly toward the tip portion to exit the turbine blade substantially medially of the blade at its tip portion. The steam therefore flows in serpentine fashion from adjacent the leading and trailing edges in opposite axial directions toward a mid-portion of the turbine blade. Thus, the steam which has collected the most heat from the blade advantageously exits the blade at a location which has the lowest metal temperature.

The leading edge circuit flows steam radially outwardly between an inlet port at the root portion of the blade and an outlet at the tip portion and through a plurality of radially spaced apertures opening into a recess on the leading edge of the blade. That recess is located along the stagnation or pitch area of the blade which is the area of highest blade temperature during operation. The recess contains a porous material, such as woven wire mesh of high density, whereby steam from the first leading edge circuit flows through the apertures into the recess through the mesh for transpiration cooling. The trailing edge circuit flows steam from an inlet port adjacent the root portion of the blade to an outlet adjacent the tip portion, as well as through a series of apertures radially spaced along the trailing edge of the blade.

Additionally, on the pressure side of each vane, there is provided a series of bleed film cooling holes radially spaced along the blade and in communication preferably with the first passageway of the forward intermediate circuit for supplying film cooling steam along the pressure surface of the vane. Film cooling is provided because steam has superior radiant properties, e.g., absorbtivity and emissivity, and absorbs much of the radiant energy and emits this energy at a lower intensity. On the pressure side of the vane, there is also provided a series of bleed film cooling holes radially spaced along the blade, preferably in communication with the final passageway of the aft intermediate circuit. The location of these bleed film cooling holes between the leading and trailing edges of the blade on the suction side is selected because the boundary layer thickens along this area. The boundary layer increases the convective thermal load on the part. By reducing the boundary layer by thin film cooling, the convective thermal load on the part is reduced.

The second-stage turbine blades are each provided with a plurality of straight-through radial passages for passing cooling steam radially outwardly to the blade tips. Each turbine stage has a steam collection shroud adjacent the tips of the blades for collecting the cooling steam.

In accordance with this invention, an air cooling system is integrated with the steam cooling system just described. To accomplish this, a rotating nozzle collar is provided on the inner circumference of the first-stage wheel. Fixed and movable valve structures are mounted about the shaft. The valve is normally closed to prevent air under pressure from the compressor from flowing radially outwardly into the spaces between the wheels and spacer and into the chambers. During start-up or off-design operation, for example, when steam pressure is not available or lost, the solenoid is actuated to open the valve to provide air under pressure into those areas for flow through the inlet ports of the first and second-stage turbine blades to effect cooling. After start-up or when the air cooling is generally not needed, the solenoid closes the valve to prevent air from entering those spaces.

In a preferred embodiment according to the present invention, there is provided a cooling system for a gas turbine comprising a pair of axially spaced, rotatable turbine stages, each having a plurality of turbine blades for disposition in a gas flow through the turbine, the turbine blades each having at least one interior passage extending from an inlet port adjacent a root portion of the blade to an outlet port adjacent a tip portion of the blade. A nozzle stage is provided between the turbine stages and includes a plurality of nozzle vanes for disposition in the gas flow, with each vane having at least one interior passage having an inlet and an outlet adjacent respective radially outer and inner end portions of the vane for passing steam from the inlet radially inwardly through the vane to the outlet. Also provided is a spacer between the turbine stages and rotatable therewith, with at least one passageway through the spacer and in communication with the outlets for the vanes and the inlet ports for the turbine blades for flowing steam from the nozzle vanes to the turbine blades, whereby steam may flow through the passages in the blades to cool the blades.

In a further preferred embodiment according to the present invention, there is provided a blade for the turbine stage of a gas turbine, comprising a turbine blade body having a discrete length and a general airfoil shape, with pressure and suction sides, tip and root portions and leading and trailing edges, a plurality of discrete internal passages extending lengthwise along the blade having inlet and outlet ports adjacent the root and tip portions, respectively, for flowing cooling fluid through the blade including a pair of single-pass passages adjacent the leading and trailing edges, respectively, and at least one multi-pass passage intermediate the leading and trailing edges and the single-pass passages. The multi-pass passage has at least three discrete passageways for flowing cooling fluid from the root portion toward the tip portion, back toward the root portion and again toward the tip portion to cool intermediate portions of the blade.

In a further preferred embodiment according to the present invention, there is provided a method for cooling a multi-stage gas turbine having a pair of rotatable turbine stages, each having a plurality of turbine blades, a nozzle stage between the turbine stages and having a plurality of nozzle vanes, and a spacer between the turbine stages inwardly of the nozzle stage, comprising the steps of flowing steam radially inwardly through the nozzle vanes and through apertures in the spacer into a pair of chambers on opposite sides of the spacer and flowing steam from the chambers into cooling passage within the turbine blades to cool the blades with the steam exiting the blades adjacent the tips of the blades.

Accordingly, it is a primary object of the present invention to provide a novel and improved steam cooling system for combined cycle gas turbines with integrated air cooling for start-up or off-design operating conditions and methods of operation.

These and further objects and advantages of the present invention will become more apparent upon reference to the following specification, appended claims and drawings.

BRIEF DESCRIPTION OF THE DRAWING FIGURES

DETAILED DESCRIPTION OF THE DRAWING FIGURES

Reference will now be made in detail to a present preferred embodiment of the invention, an example of which is illustrated in the accompanying drawings.

Figure 1:
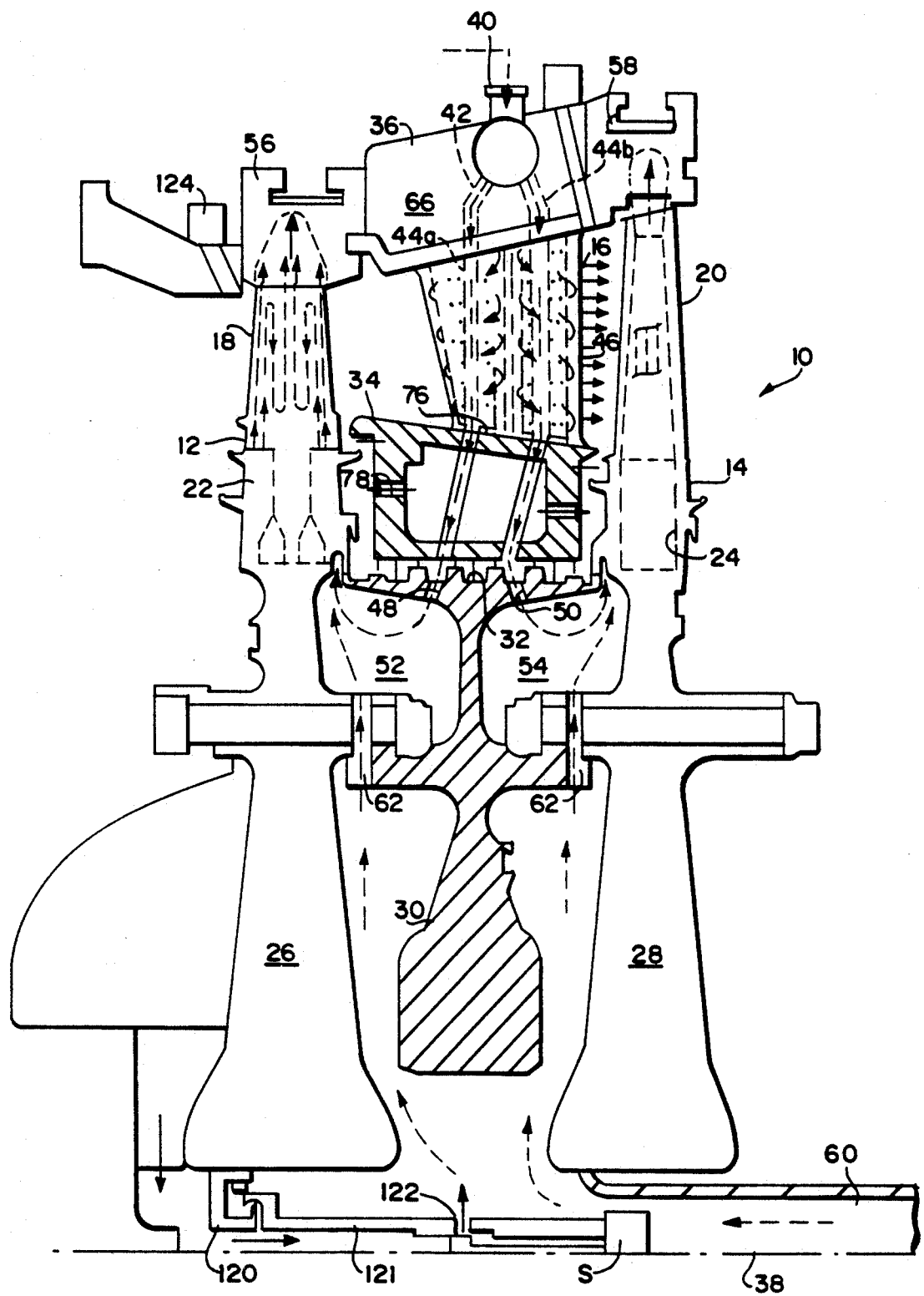
FIG. 1 is a fragmentary longitudinal cross-sectional view through the shaft of a turbine illustrating first and second turbine stages and a second nozzle stage according to the present invention.

Referring now to the drawings, particularly to FIG. 1, there is illustrated a section of a combined cycle gas turbine, generally designated 10, including first and second turbine stages 12 and 14, respectively, and a second nozzle stage 16. Each of the first and second turbine stages includes a plurality of turbine blades 18 and 20, respectively, mounted on pedestals 22 and 24, in turn, mounted on turbine wheels 26 and 28. A spacer 30 is disposed axially between and secured to wheels 26 and 28 for rotation therewith and includes a sealing surface 32 for sealing against the inner face of a fixed diaphragm 34 forming part of the second nozzle stage 16. The inner face of the diaphragm 34 preferably forms a labyrinth seal with the outer face 32 of spacer 30. The second nozzle stage 16 includes a plurality of fixed radially extending vanes 46 circumferentially spaced one from the other and extending radially outwardly from diaphragm 34 to a turbine support frame 36. The turbine shaft is schematically represented by the dashed line 38. It will be appreciated that gas from turbine combustors, not shown, flows generally axially, for example, from left to right in FIG. 1, through first-stage nozzles, not shown, for driving the first turbine stage, which gas then flows through the fixed second-stage nozzles for driving the second turbine stage.

In accordance with the present invention, there is provided a system for integrating steam and air cooling circuits in a single gas turbine. To accomplish this, steam is passed from a source, not shown, of the combined cycle turbine through a manifold 40 having a pair of branches 42 coupled with tubes 44a and 44b which extend radially inwardly along the interior of each nozzle vane 46. Tubes 44a and 44b pass through diaphragm 34 and exit along the inner face of the diaphragm at the adjoining seal faces of the diaphragm 34 and spacer 30. The flow of steam then passes through injector nozzles 48 and 50 of spacer 30 inwardly of the spacer seal face 32 into interior chambers 52 and 54 on axially opposite sides of spacer 30. The steam in chambers 52 and 54 communicates with inlet ports in the pedestals adjacent the root portions of turbine blades 18 and 20 for supplying cooling steam to the turbine blades. The steam exits the tip portions of the blades 18 and 20 into shrouds 56 and 58, respectively.

Steam is also inlet to chambers 52 and 54 from a location adjacent shaft 38. For example, steam is inlet axially at 60 for flow into the spaces between spacer 30 and wheels 26 and 28 and through passages 62 into chambers 52 and 54. This combined steam flow then passes through the turbine blades to cool the blades.

The mixing of the two steam flows in chambers 52 and 54 minimizes or eliminates undesirable vortex circulation cells in the cavities which might otherwise occur. The steam exiting through the shrouds 56 and 58 may pass directly to a stack, not shown, or pass through a closed heat exchanger, also not shown, to transfer heat to low-pressure incoming steam.

Figure 2:
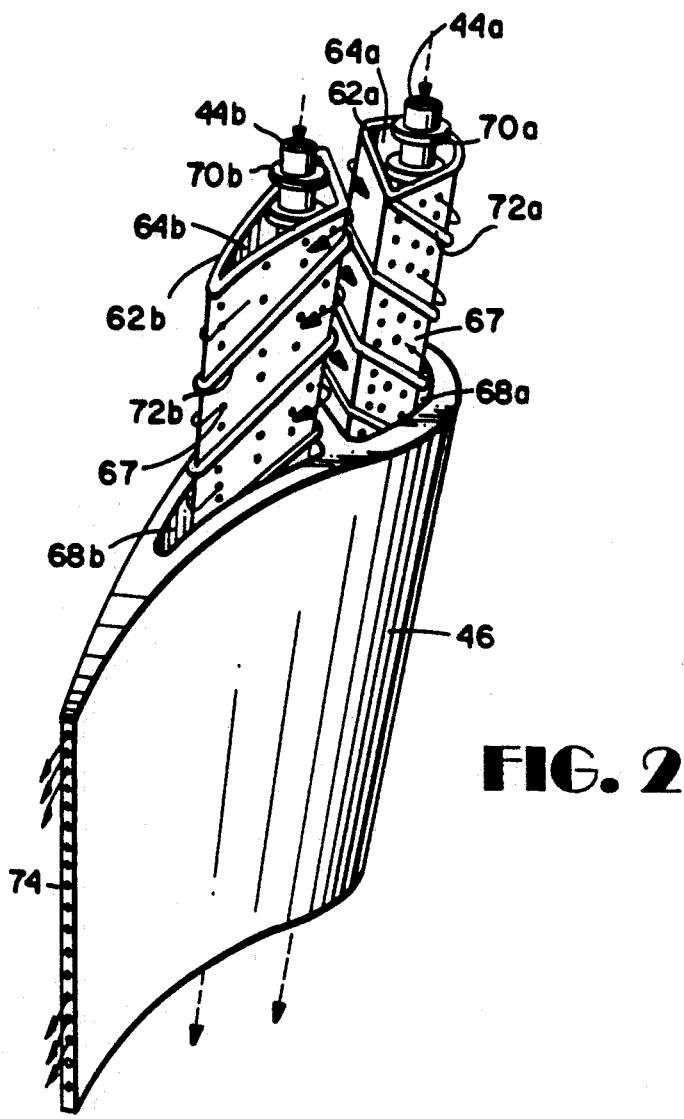
FIG. 2 is a perspective view with parts broken out to illustrate the cooling passages within a nozzle vane of the second-stage nozzle.
Figure 3:
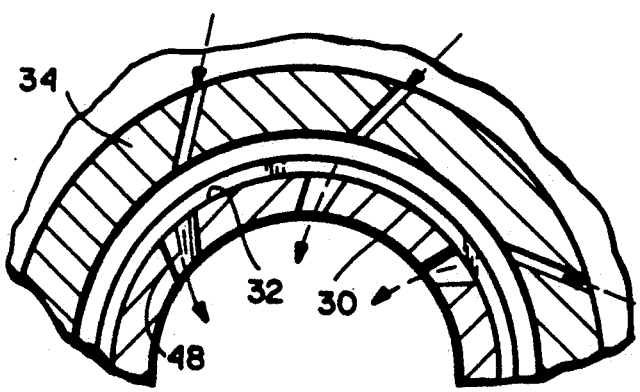
FIG. 3 is a fragmentary enlarged cross-sectional view illustrating a seal between the diaphragm of the second-stage nozzle and the sealing face of a spacer and further illustrating the flow of steam from the fixed diaphragm through the spacer into the chambers.

In FIG. 2, there is illustrated a cutaway view of a single nozzle vane 46 of the second nozzle stage 16 and further illustrating tubes 44a and 44b which pass cooling steam through the vane 46. Each tube 44a and 44b is enclosed within an insert 62a and 62b which extends coextensively with tubes 44a and 44b, respectively, the full length of vanes 46.

Each insert 62a and 62b surrounds a respective tube 44a and 44b to define an air passageway 64a and 64b between it and the surround tube. Air is inlet to passageways 62a and 62b via air chambers 66 (FIG. 1) formed in the frame of the turbine. Each insert 62a and 62b is provided with a plurality of very small apertures 67 whereby air, under pressure, within passages 64a and 64b can expand through the apertures into the respective cavities 68a and 68b defined between the inserts and the interior walls of the vanes 46. Tubes 44a and 44b carry fins 70a and 70b, respectively, which cause the cooling air flow in passages 64a and 64b, respectively, to be turbulent. As the turbulent air flows about the fins, the capacity to carry additional convection energy from the walls of tubes 44a and 44b is enhanced. Secondly, the fins enhance the conductive heat transfer from the tube walls to the air. Thus, steam flowing through tubes 44a and 44b is reduced in temperature, while the air carries the heat energy to the insert walls. The coolant air in passages 64a and 64b expands through the impingement apertures 67 into cavities 68a and 68b to provide a plurality of cooling air jets to impinge against the interior walls of vanes 46.

Flow divider tubes 72a and 72b are provided on inserts 62a and 62b, respectively. Preferably, the divider tubes are spiral or helical to direct the air flow in a radially inwardly helical flow direction, thus enhancing the heat transfer relation with the interior walls of nozzle vanes 46. As illustrated, a plurality of radially spaced apertures 74 are provided along the trailing edge of each vane 46 in communication with cavity 68b to vent the cooling air into the gas stream. The cavities 68a and 68b also communicate through vent spacing 76 (FIG. 1) with the interior of diaphragm 34. The interior of diaphragm 34, in turn, lies in communication with the gas flow through the turbine through axially opening apertures 78.

Figure 4:
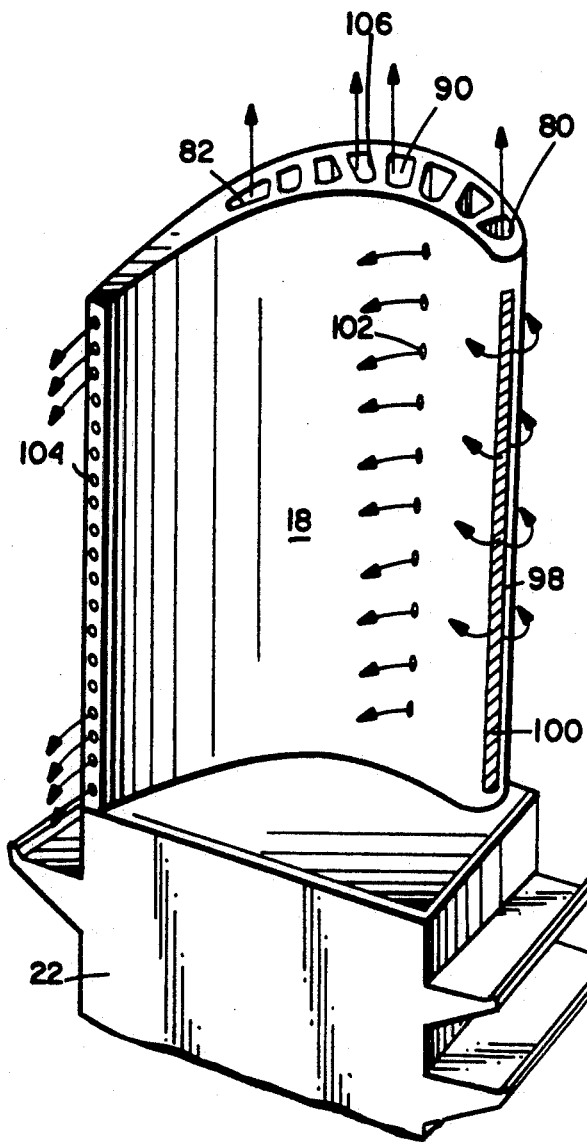
FIG. 4 is a perspective view of a turbine blade constructed in accordance with the present invention.
Figure 5:
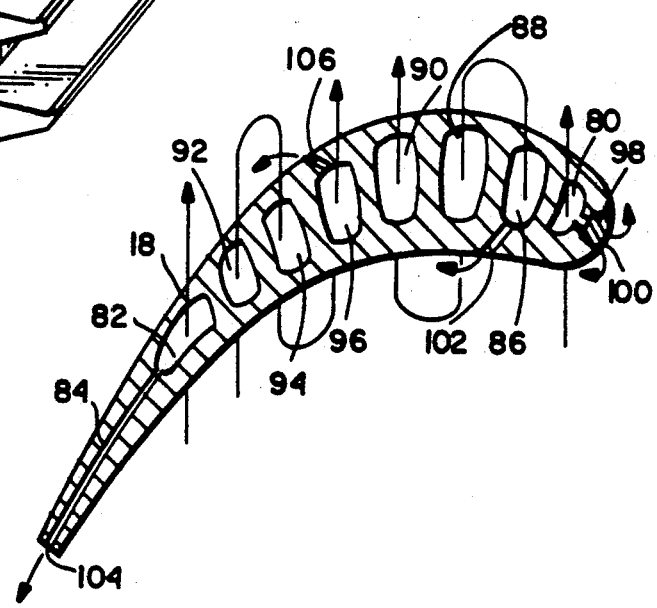
FIG. 5 is a cross-sectional view of the blade illustrating the various steam flow cooling paths.

Turning now to FIGS. 4 and 5, there is illustrated a first-stage turbine blade 18 mounted on its pedestal 22. Each turbine blade 18 has a serpentine cooling arrangement comprising preferably four discrete cooling circuits extending from adjacent the root portion of the blade to its tip portion. The leading edge circuit comprises a radially straight single-pass passageway 80 in communication adjacent its root portion with an inlet port for receiving steam from chamber 52 (FIG. 1). Passageway 80 has an outlet port adjacent its tip portion for flowing steam from the blade into shroud 56 (FIG. 1). A single-pass trailing edge circuit is provided and comprises a passageway 82 in communication with an inlet port adjacent its root portion for receiving steam from chamber 52. Passageway 82 extends radially outwardly through the blade exiting through an outlet port at its tip portion for flowing steam into shroud 56. The trailing edge passageway 82 also communicates with a plurality of radially spaced passages 84 which open through apertures 104 at the trailing edge of blade 18. The two intermediate circuits comprise three-pass forward and aft circuits, respectively. The forward circuit includes a passageway 86 in communication with an inlet port adjacent the root portion of the blade for receiving steam from chamber 52. The steam flows from the root portion along passageway 86 toward the tip portion, back radially inwardly through a second passageway 88 and again toward the tip portion through passageway 90. The trailing three-pass circuit similarly includes a passageway 92 having an inlet port adjacent the root portion in communication with chamber 52 for passing steam radially outwardly through passageway 92 toward the tip portion, back toward the root portion via passageway 94 and then again toward the tip portion via passageway 96 for exit into fixed shroud 56. The multiple-pass forward and aft intermediate circuits are arranged so that the final pass in each circuit lies substantially in the middle or mid-way of the airfoil shape of the blade, as illustrated in FIG. 5, i.e., through passageways 90 and 96. The passageways are arranged in this manner such that the final passageways lie in the area of the airfoil having the lowest metal temperature.

It is a particular feature of the present invention that steam cooling is provided adjacent the stagnation point or area of the airfoil, i.e., an area substantially along the mid-portion of the leading edge of the airfoil. It is important to cool the stagnation area because the temperature can approach the blade's melting temperature. To eliminate this severe thermal condition, a recess 98 is formed, for example, during casting, in the leading edge of the blade. Recess 98 contains a porous material 100, for example, a woven wire mesh of high density. Recess 98 lies in direct communication with the single-pass leading edge passageway 80 for supplying steam in the recess and through the mesh material for outflow along the opposite sides of the airfoil blade. Thus, transpiration cooling is applied to the leading edge.

Another significant feature of the present invention resides in the provision of film cooling along both suction and pressure sides of the blade. Particularly, there is provided on the pressure side of the airfoil, cooling passages 102 spaced along the length of the blade and in communication with the first passageway 86 of the forward intermediate circuit. The first passageway 86 is used as the cooling supply for the thin film coolant along the pressure side because the radiant heat flux is most severe along the forward portion of the pressure side of the airfoil. On the suction side, a series of passages 106 lie in communication with the final passageway 96 of the trailing cooling circuit to establish film cooling along the suction side. Passages 106 are located along the airfoil substantially where the boundary layer thickens, which increases the convective thermal load on that part. Thus, the thin film cooling enhances the heat transfer relation along that portion of the airfoil previously inhibited from substantial heat transfer by the boundary layer.

Referring back to FIG. 1, there is also illustrated a system for air cooling the turbine during start-up or shut-down or off-design conditions when steam is not available. The air cooling system includes a passageway in communication via ducting, not illustrated, with the turbine compressor, for flowing air adjacent the shaft and past a rotating nozzle collar 120. There is also provided a non-rotatable annular valve part 121 movable by a solenoid S to define a normally closed air gap 122. Actuation of solenoid S may be provided by a set of pyrometers 124 installed adjacent the tips of the first and second-stage turbine blades for sensing the temperature of the metal of the blades. The pyrometers are of known construction and emit electrical signals which may be forwarded to analog processing units for amplification and control of solenoid S. Consequently, when the temperature of the blade is above a predetermined temperature, the pyrometers sense such temperature and actuate solenoid S to open air gap 122, enabling air to flow along the shaft and radially outwardly through gap 122 into the space between the wheels and the spacer. The air may then flow radially outwardly into chambers 52 and 54 for flow into the serpentine passages of the first-stage turbine blades and into the radially straight passages of the second-stage turbine blades.

With the turbine operating at normal load conditions, steam is inlet to manifold 40 for flow via passages 42 through tubes 44a and 44b in nozzle vanes 46. As the steam passes through the vanes 46, air is conducted via chambers 66 into passages 64a and 64b for heat transfer relation with the steam. Particularly, the steam temperature is reduced, while the air temperature is increased. However, the expansion of the air through the apertures of the inserts cools the air for direct cooling impingement upon the inner walls of vanes 46, thereby cooling vanes 46. The air also flows through the trailing aperture 74 into the gas flow and also into the interior of diaphragm 34 for passage through the apertures 78 for flow likewise into the gas flow.

The steam passing through tubes 44a and 44b at reduced temperature passes through diaphragm 34 and across the seal surface into injector nozzles 48 and 50 for flow into chambers 52 and 54. Injectors 48 and 50 are designed to accelerate the flow into chambers 52 and 54. The cooling steam then flows into the inlet ports of the passages in the first and second-stage turbine blades. In the first-stage turbine blades, the cooling steam passes through the four cooling circuits to cool the blades. The cooling steam also passes into the recess 98 through mesh 100 to cool the stagnation area along the leading edge of the airfoil. Cooling steam also passes through apertures 102 along the pressure side to provide a thin-film cooling effect. Similarly, thin-film cooling is provided on the suction side by passing the cooling steam through the passages 106 in the suction side. Cooling steam also passes through the passageways 84 from the trailing circuit for egress through the apertures 104 in the trailing edge.

The steam supplied to the turbine blades is also augmented by steam flowing through passage 60 and radially outwardly past the spacer into chambers 52 and 54. The integration of the two steam flows into chambers 52 and 54 promotes the steam flow into the first and second-stage blades without undesirable vortex circulation cells.

At start-up or during a period of time when steam is not available, air cooling may be provided to the blades and vanes. For the nozzle-stage vanes, the air may be supplied, as previously described, into the inserts for expansion and impingement against the interior wall surfaces of the vanes and eventual egress from the vanes into the gas flow. With respect to the turbine blades, air may be provided through the air passageway gap 122 upon actuation of the solenoid S. Thus, air is supplied on opposite sides of the spacer and into the chambers 52 and 54 for flow through the cooling passages of the first and second-stage turbine blades.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A cooling system for a gas turbine comprising:
   a pair of axially spaced, rotatable turbine stages, each having a plurality of turbine blades for disposition in a gas flow through said turbine;
   said turbine blades each having at least one interior passage extending from an inlet port adjacent a root portion of the blade to an outlet port adjacent a tip portion of the blade;
   a nozzle stage between said turbine stages and including a plurality of nozzle vanes for disposition in the gas flow;
   each said vane having at least one interior passage having an inlet and an outlet adjacent respective radially outer and inner end portions of said vane for passing steam from said inlet radially inwardly through said vane to said outlet;
   a spacer between said turbine stages and rotatable therewith;
   at least one passageway through said spacer and in communication with said outlets for said vanes and said inlet ports for said turbine blades for flowing steam from said nozzle vanes to said turbine blades, whereby steam may flow through said passages in said blades to cool said blades.

2. A system according to claim 1 including a turbine shaft, wheels about said shaft mounting said turbine blades and spaced axially from and on opposite sides of said spacer to define chambers on axially opposite sides of said spacer, a channel adjacent said shaft for supplying steam to said chambers, said chambers lying in communication with said passageway through said spacer and said inlet ports for said turbine blades whereby cooling steam is supplied from said channel and said nozzle vanes to said chambers for flow to said turbine blades.

3. A system according to claim 2 including a cooling air inlet adjacent said shaft for supplying cooling air to said chambers and the inlet ports of said turbine blades, and a valve for selectively controlling the flow of air through said air inlet.

4. A system according to claim 3 including a sensor for sensing the temperature of the turbine blades and means responsive to said sensor sensing a predetermined temperature of said blades for opening said valve to admit cooling air through said cooling air inlet.

5. A system according to claim 1 wherein said nozzle stage includes a diaphragm about said spacer, wheels mounting said turbine blades and spaced axially from said spacer to define chambers on opposite sides of said spacer and in communication with said inlet ports for said turbine blades, and a plurality of passageways passing through said spacer to communicate steam from said outlets to said chambers.

6. A system according to claim 5 including means defining a seal between said spacer and said diaphragm, each vane having an air passage for flowing air radially inwardly, said spacer having a passage for receiving air from said air passage in said vane and an outlet radially outwardly of said seal for delivering air to the gas flow through the turbine.

7. A system according to claim 5 wherein said passageways through said spacers comprise injector nozzles for accelerating the steam flow through said spacer into said chambers.

8. A system according to claim 1 wherein said interior passage through each said nozzle vane is defined by a tube, an insert about said tube defining an air path between said insert and said tube for flowing air through said vane in heat transfer relation with steam passing through said tube, said insert being spaced from interior walls of said nozzle vane to define a cavity therewith, said insert having a plurality of apertures for communicating air from said air path within said insert into said cavity for cooling said vane, and means providing an exit for the air from said cavity.

9. A system according to claim 8 wherein said exit means includes a plurality of apertures along the trailing edge of said vane.

10. A system according to claim 8 wherein said nozzle stage includes a diaphragm about said spacer, said exit means including an air passageway in said diaphragm in communication with said cavity for delivering cooling air from said cavity.

11. A system according to claim 8 including ribbing externally about said insert for directing the air received through said apertures and into said cavity for flow to said exit means.

12. A system according to claim 11 wherein said ribbing extends helically about said insert for directing air in a generally radial inward direction.

13. A system according to claim 8 wherein said nozzle stage includes a diaphragm about said spacer, said exit means including an air passageway through said diaphragm in communication with said cavity for delivering cooling air from said cavity, and ribbing disposed externally about said insert for directing the air received through said apertures and into said cavity for flow to said exit means.

14. A system according to claim 8 including a plurality of ribs externally about said tube for facilitating heat transfer between the steam in said tube and the air in said air path within said insert about said tube.

15. A system according to claim 8 wherein said nozzle stage includes a diaphragm about said spacer, wheels mounting said turbine blades and spaced axially from and on opposite sides of said spacer to define chambers on opposite sides of said spacer and in communication with said inlet ports for said turbine blades, a plurality of said passageways passing through said spacer for communicating steam into said chambers, said exit means including an aperture through said diaphragm.

16. A method for cooling a multi-stage gas turbine having a pair of rotatable turbine stages, each having a plurality of turbine blades, a nozzle stage between the turbine stages and having a plurality of nozzle vanes, and a spacer between said turbine stages inwardly of said nozzle stage, comprising the steps of:

flowing steam radially inwardly through said nozzle vanes and through apertures in said spacer into a pair of chambers on opposite sides of said spacer; and flowing steam from said chambers into cooling passages within said turbine blades to cool said blades with said stem exiting said blades adjacent the tips of said blades.

17. A method according to claim 16 including the step of flowing cooling air into said chambers in lieu of flowing steam into said chambers.

18. A method according to claim 16 wherein the turbine blades and nozzle vanes define a gas flow passage through said turbine, and said spacer and said nozzle stage form a seal separating the gas flow passage from said chambers, and including the step of flowing the steam past said seal into said chambers.

19. A blade for the turbine stage of a gas turbine, comprising:

a body having a discrete length and a general airfoil shape, with pressure and suction sides, tip and root portions and leading and trailing edges;

a plurality of discrete internal passages extending lengthwise along said blade having inlet and outlet ports adjacent said root and tip portions, respectively, for flowing cooling fluid through the blade including a pair of single-pass passages adjacent said leading and trailing edges, respectively, and first and second multi-pass passages intermediate said leading and trailing edges and said single-pass passages;

each of said first and second multi-pass passages having first, second and third discrete passageways for flowing cooling fluid from said root portion toward said tip portion, back toward said root portion and finally toward said tip portion, respectively, to cool intermediate portions of said blade, said third passageways disposed adjacent one another, said first and second passageways of said first multi-pass passage being disposed between the leading edge and said third passageway thereof, said first and second passageways of said second multi-pass passage being disposed between the trailing edge and said third passageway thereof whereby cooling fluid flows through said first and second passages generally toward one another for exit through outlets thereof substantially medially of the airfoil-shaped body and at said tip portion of said blade.

20. A blade according to claim 19 wherein said leading edge has a recess formed lengthwise along a stagnation area along said leading edge, a porous material disposed in said recess, at least one aperture in said leading edge providing communication between said single-pass passage adjacent said leading edge and said recess for flowing the cooling fluid from said leading edge single-pass passage to said recess and through said porous material for cooling the leading edge.

21. A blade according to claim 19 including a plurality of apertures spaced one from the other along said trailing edge and in communication with said trailing edge single-pass passage for flowing the cooling fluid from said trailing edge single-pass passage through said apertures for cooling said trailing edge.

22. A blade according to claim 19, wherein said body has a plurality of apertures spaced one from the other along the length of and opening through a concave side of said blade, said apertures lying in communication with one of the passageways of said first passage and being angled toward said trailing edge for flowing cooling fluid therefrom to provide film cooling along said concave side of said blade.

23. A blade according to claim 22 wherein said apertures lie in communication with the initial passageway of said first intermediate passage, said initial passageway being disposed forwardly of the other passageways of said first intermediate passage.

24. A blade according to claim 19 wherein said body has a plurality of apertures spaced one from the other along the length of and opening through a convex side of said blade, said apertures lying closer to said trailing edge than said leading edge and in communication with one of the passageways of said second passage for flowing cooling fluid to provide film cooling along said convex side of said blade.

* * * * *